INVENTOR.
CHARLES E. LENZ

March 10, 1970

C. E. LENZ 3,500,449

ELECTRONIC ENCODER INDEX

Filed Oct. 2, 1967

INVENTOR.
CHARLES E. LENZ
BY
ATTORNEY

March 10, 1970               C. E. LENZ                3,500,449
                      ELECTRONIC ENCODER INDEX
Filed Oct. 2, 1967                                  5 Sheets-Sheet 4

INVENTOR.
CHARLES E. LENZ
BY
ATTORNEY

United States Patent Office 3,500,449
Patented Mar. 10, 1970

3,500,449
ELECTRONIC ENCODER INDEX
Charles E. Lenz, Honolulu, Hawaii, assignor to North American Rockwell Corporation
Filed Oct. 2, 1967, Ser. No. 672,350
Int. Cl. H01j 39/12
U.S. Cl. 250—214
14 Claims

ABSTRACT OF THE DISCLOSURE

A device for establishing an index position from which an incremental position encoder may measure absolute position. The encoder index is responsive to the angle of an input shaft and generates signals which indicate (1) the approximate displacement of the shaft from the index position, (2) the direction of rotation necessary to reach the index position with minimum motion, and (3) when the shaft is at the index position.

BACKGROUND OF THE INVENTION

Field of the invention

The present invention relates to an electronic encoder index, and, more particularly, to means for establishing the index or reference position from which an incremental position encoder may measure relative motion to determine absolute position.

Description of the prior art

The present invention is designed for use with an incremental position encoder in which the angle of a rotary shaft is first converted to a phase modulated carrier signal and wherein the phase of the carrier signal is then converted to incremental digital signals. Although such an incremental position encoder can measure the net amount by which the input shaft has rotated from a given starting position with accuracy approaching at least an arc second, it is inherently incapable of measuring position in an absolute sense. To measure absolute position, the encoder must first be rotated to a known index or reference position, from which net motion can be measured. Clearly, the measurement accuracy is determined as fully by the accuracy with which the index position is established as by the accuracy of the position encoder itself.

Many prior art systems have been proposed for establishing such an index position. In order for the encoder index not to add any error to the overall encoding error, typical encoder indexes are constructed with tolerances which are the same or better than those of the encoder with which they are used. In addition, the extreme accuracy with which the encoder index is constructed requires an extremely fine initial adjustment in conventional indexing devices.

The purpose of the present invention is to provide an electronic encoder index which establishes, with unusual accuracy, the index or reference position from which an incremental encoder measures relative motion by unique means which contribute literally zero error to the overall encoding error, an ideal unattainable in practice with conventional methods. Paradoxical as it may seem, such performance is obtained with an encoder index which is constructed to tolerances wider by an order of magnitude or more than those of the incremental position encoder itself. This characteristic makes it possible to construct an encoder index which is economical, easily adjusted and insensitive to environmental variation.

SUMMARY OF THE INVENTION

In accordance with the present invention, there is provided an electronic encoder index which supplies all signals necessary to control an external actuator in the manner necessary to drive the associated incremental position encoder to the index quantum, i.e. to the resolution quantum containing the index position. The basic components of the electronic encoder index are a transducer index channel, a coarse index detector, and a fine index detector, the latter consisting of a phase quadrant detector and a null detector which identifies the index position. The transducer index channel is responsive to the input shaft angle and is operative to generate a pair of analog outputs from which (1) the limits of the index quantum can be identified, (2) ambiguity of the phase angle of the phase modulated carrier signal in the position encoder can be resolved, and (3) an error modulous signal can be derived. The coarse index detector converts the outputs of the transducer index channel into a pair of coarse motion command signals which, in the range of large absolute error, indicate the direction of shaft rotation necessary to reach the index position with minimum motion. The fine index detector determines precisely when the angle of the input shaft lies within the index quantum and generates a pair of output signals accordingly. This component has two operating modes, selected in accordance with the absolute value of the instantaneous displacement of the shaft angle from the index position. In the range of large absolute error, the output signals are identical to the outputs of the coarse index detector. In the range of small absolute error, but excluding the index quantum, the steady-state output signals are controlled by the phase quadrant detector to indicate when the shaft angle has rotated past the index quantum. Finally, when the shaft angle is within the index quantum, the output of the fine index detector provides output signals to so indicate.

It can, therefore, be seen that the present encoder index generates signals which indicate (1) the approximate displacement from the index position to permit reduction of the slewing speed near that location to prevent overshoot, (2) the direction of rotation necessary to reach the index position with minimum motion, and (3) when the encoder is at the index position. In addition, no error whatever is added to the overall encoding error by the present electronic index even if, in typical cases, it is constructed with tolerances over an order of magnitude broader than those of the incremental position encoder with which it is used. In contrast, any error in a conventional indexing device contributes directly to the total encoding error. This feature of the present invention permits realization of the full benefit of the accuracy and resolution with which the associated encoder is constructed. Total freedom from indexing error can be employed either (1) to permit realization of the ultimate accuracy with which physical limitations permit an encoder to be constructed when extreme overall position accuracy is required, or (2) to permit reduction of encoder accuracy and cost when less overall accuracy is needed. In addition, the relatively broad accuracy acceptable with the present electronic index permits an extremely compact angular electronic index to be constructed for use with an encoder of given accuracy and resolution.

The initial adjustment of the present electronic encoder index is far easier than that possible with conventional indexing devices. This advantage results directly from the wider index tolerances permissible without effecting the overall accuracy of the electronic index and the associated encoder. In addition, the electronic encoder index is unusually insensitive to variations either in supply voltages or environmental conditions. This advantage is also a direct benefit of the relative independence of overall encoding accuracy from the accuracy of the electronic index.

One function of the electronic encoder index is to provide signals to indicate the direction of displacement from the index position. In the angular case, these signals indicate the shortest path to the index position. This feature minimizes indexing time, particularly when the maximum slewing speed available is not high, as is common with control systems of extreme accuracy. In addition, the design of the electronic encoder index for an angular application completely eliminates ambiguity in indicating the proper direction of rotation at positions near 180° from the index position. As a result, no additional electro-optical elements are required for this purpose.

Without additional equipment, the electronic index also generates a coarse absolute error signal to indicate the approximate proximity of the instantaneous shaft angle to the index position. This feature permits more rapid indexing than is possible with conventional indexing devices; neither slow slewing nor overshoot need be tolerated when indexing speed is varied in accordance with the absolute error signal.

Maximum use is made in the present invention of fully digital components. Such component typically exhibit greater stability than analog elements in the presence of environmental variations, voltage changes and aging. All outputs of the electronic index are discrete signals fully compatible with on-line digital computers. Thus, no additional conversion equipment is required to initially position a control system which utilizes an encoder and actuator in conjunction with separate digital computation equipment to provide error evaluation and compensation.

The present electronic encoder index functions completely without mechanical contacts or parts subject to wear or mechanical deflection found in conventional indexing devices. No moving parts not rigidly attached to the input shaft are employed in the angular case. Thus, operation without degradation or readjustment can continue indefinitely to yield maximum reliability.

Finally, little restriction is imposed upon the element the position of which is to be measured. Electrical connections to the movable element of the electronic encoder index are not employed making both sliding contacts and flexible leads unnecessary. In the angular case, continuous unimpeded rotation is thus possible without utilization of the retractable stops or other relatively complex expedients normally required.

OBJECTS

It is therefore an object of the present invention to provide means for establishing an index or reference position from which an incremental encoder may measure relative motion to determine absolute position.

It is a further object of the present invention to establish an index or reference position by unique means which contribute literally zero error to the overall encoding error.

It is a still further object of the present invention to provide means for establishing an index position by means which contribute zero error to the overall decoding error even when it is constructed to tolerances wider by an order of magnitude or more than those of the encoder itself.

It is another object of the present invention to provide an electronic encoder index which indicates the direction of rotation which is necessary to reach the index position with minimum motion.

It is still another object of the present invention to provide an electronic encoder index which indicates the approximate displacement from the index position so as to permit reduction of the slewing speed near that location to prevent overshoot.

Still other objects, features and attendant advantages of the present invention will become apparent to those skilled in the art from a reading of the following detailed description of a preferred embodiment constructed in accordance therewith, taken in conjunction with the accompanying drawings wherein:

DESCRIPTION OF THE PREFERRED EMBODIMENTS

Figure 1:
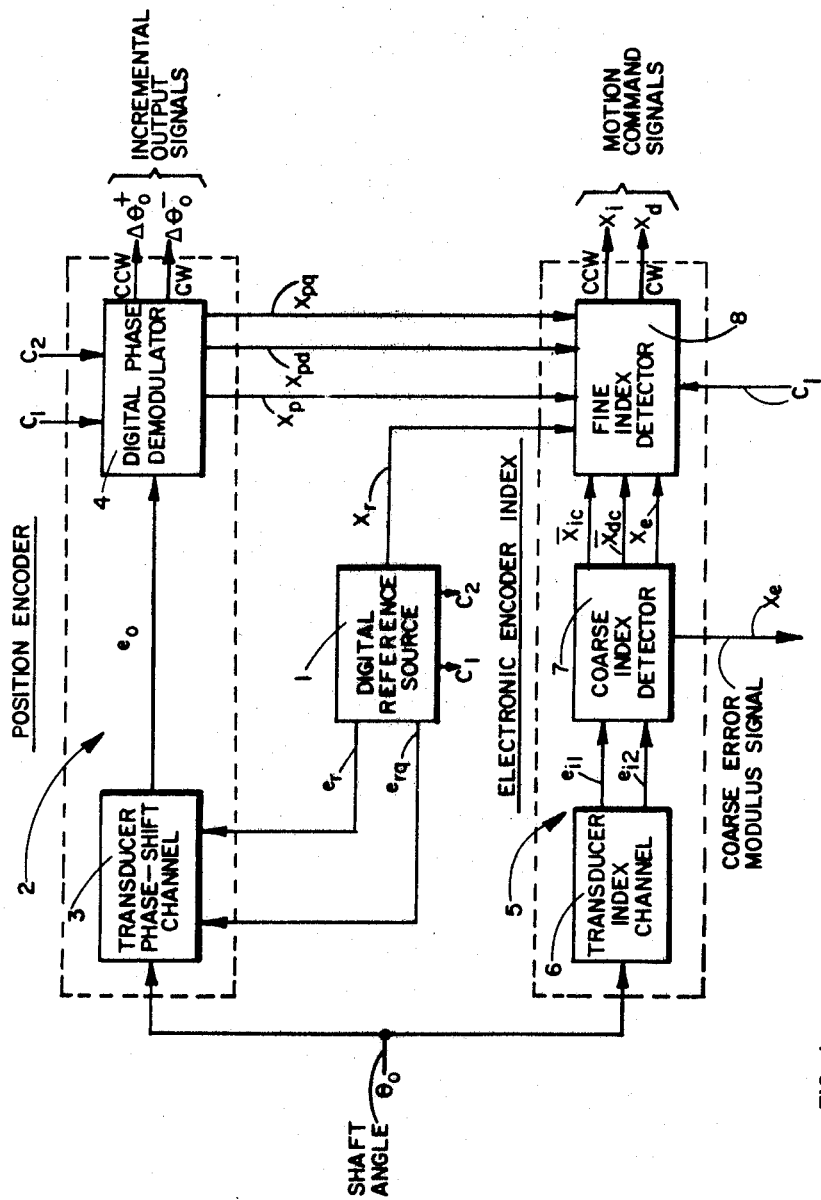
FIGURE 1 is a block diagram showing the basic components of the present electronic encoder index together with the equipment with which it operates.

Referring now to the drawings and, more particularly, to FIGURE 1 thereof, there is shown a block diagram of the electronic encoder index together with the incremental position encoder and the digital reference source with which it operates. The present electronic encoder index can be designed to operate with either an angular or linear encoder. For purposes of explanation, the angular case, which is slightly more difficult because of the cyclic nature of the index outputs required, will be treated here.

Various incremental encoders of the type in which position is first converted to a carrier phase shift and the phase shift is then converted to incremental digital outputs may be employed with the electronic index. One type of angular encoder with which the present invention may be operated is disclosed in my co-pending U.S. patent application Ser. No. 463,090 entitled "Fine Resolution Digital Position Encoder," filed June 11, 1965. Although the present invention will be described with respect to its use with such a position encoder incorporating a high-speed electro-optical phase-shift transducer for transforming mechanical motion to a corresponding phase shift of a carrier signal (ref.: Charles E. Lenz, "Analysis of a Miniature Encoder for Arc-Second Measurements in Avionic Systems," Instrument Society of America Conference Proceedings, part III, Vol. 20, 1965, pp. 3–7, 13–18) it will be apparent to those skilled in the art that the present invention can operate with many types of encoder systems and phase-shift transducers. For example, the phase-shift transducer may be an appropriately connected electromagnetic resolver (ref.: A. R. Upson and J. H. Batchelor, Synchro Engineering Handbook, London, Hutchinson and Co., Ltd., 1966, pp. 119–120), Hall-effect resolver (ref.: A. R. Upson and J. H. Batchelor, Synchro Engineering Handbook, supra, pp. 14–16) or electrostatic phase shifter (ref.: John O. Morin, "Six Transducers for Precision Position Measurement," Control Engineering, vol. 7, No. 5, May 1960, pp. 109–111).

The basic components of the electronic encoder index and of the equipment associated therewith will be discussed first in terms of the required inputs, the outputs generated, and the functions of each of the components. Hereafter, all angles will be expressed in radians, all potentials in volts and all times in seconds except where otherwise stated.

A single digital reference source 1 can be used to generate all timing signals required by both the encoder index and the associated position encoder. To simultaneously meet the requirements of both, digital reference source 1 may consist of a two-phase clock, a digital two-phase carrier generator with associated band pass amplifiers and a reference angle gate. A suitable digital reference source is disclosed in my co-pending application Ser. No. 394,977 entitled Digital Reference Source, filed Sept. 8, 1964.

Reference source 1 has no signal inputs. Its basic outputs are the normally false logical clock pulse trains $C_1(t)$ and $C_2(t)$, each of period $\tau$. Both clock signals are identical except for time displacement, i.e., $$C_2(t) = C_1(t+\tau/2) \quad (1)$$

where $t$ is elapsed time. The clock pulse length, $\tau_c$, is typically $$0 < \tau_c \leq \tau/4 \quad (2)$$

During each such interval, a clock pulse remains continuously true, i.e., has the logical value 1.

In addition, digital reference source 1 has two sinusoidal outputs which may be synchronized by 1-to-0 transitions of $C_1(t)$, viz, $$e_r(t) = k_1 \sin(\omega_r t + \beta_0) \quad (3)$$

and $$e_{rq}(t) = k_1 \cos(\omega_r t + \beta_0) \quad (4)$$

where $k_1$ is a positive constant of dimension volts and $$\omega_r = 2\pi/m\tau \quad (5)$$

Here the positive integer $m$ is the interpolation ratio of the associated position encoder which is typically an integral multiple of four and equal to the number of internal states of the digital two-phase carrier generator within digital reference source 1. In other words, the positive integer $m$ indicates the number of equal increments into which one cycle of the reference carrier may be divided and, in the preferred embodiment, may typically be $2^7$ (i.e., 128). The positive angle $\beta_0$ is a constant phase bias introduced by slightly detuning the band pass amplifiers in digital reference source 1 to compensate for response delay in the logic elements employed and is adjusted to center the index quantum at $\theta_0 = 0$. Hereafter, $\beta_0$ will be assumed to approach 0. The remaining output of digital reference source 1 is a normally false logical reference angle signal $X_r(t)$ which goes true for an interval $\tau$ immediately after $\omega_r t$ passes through any integral multiple of $2\pi$.

An incremental position encoder 2 associated with the present electronic encoder index 5 quantizes the input shaft angle $\theta_0(t)$ and transforms it into a pair of incremental signal trains which constitute the encoder output as described in the aforementioned U.S. patent application Ser. No. 463,090. Such an encoder requires as inputs (1) the shaft angle $\theta_0(t)$, (2) synchronizing signals provided by the clock signals $C_1(t)$ and $C_2(t)$ and (3) carrier reference means furnished by the sinusoidal reference and quadrature carriers $e_r(t)$ and $e_{rq}(t)$. The primary encoder outputs are the incremental logical signals $\Delta\theta_0^+(t)$ and $\Delta\theta_0^-(t)$. In addition, a typical encoder can also generate the signals $X_p(t)$, $X_{pq}(t)$ and $X_{pd}(t)$ required by electronic encoder index 5.

Position encoder 2 quantizes $\theta_0(t)$ into $mn$ equal elements for every complete monotonic mechanical revolution of the input shaft, where $n$ is a positive integer. Here, $n$ may typically be $2^{13}$ (i.e., 8,192) and, if the aforementioned electro-optical transducer is used (ref.: Charles E. Lenz, "Analysis of a Miniature Encoder for Arc-Second Measurements in Avionic Systems," supra, pp. 3–7, 13–18), is determined by the number of alternate opaque and transparent areas on a code disc. Position encoder 2 emits a single pulse at one of the two output terminals for each interface between angular quanta crossed in the counterclockwise or clockwise direction. However, since encoder 2 measures position in a relative manner, initial conditions must be established by rotating the input shaft with an external actuator to a location within the range $$\pm \frac{\pi}{mn}$$

identified by electronic index 5. In other words, the index quantum is defined by the relation $$-\frac{\pi}{mn} \leq \theta_0(0) < \frac{\pi}{mn} \quad (6)$$

After the initial conditions have been set, in the steady state $$\theta_0(t) = \frac{2\pi}{mn}[p^+(t) - p^-(t)] \quad (7)$$

where $p^+(t)$ and $p^-(t)$ are the total numbers of complete pulses emitted at $\Delta\theta_0^+(t)$ and $\Delta\theta_0^-(t)$, respectively, in the time interval between 0 and $t$.

Internally, position encoder 2 consists of a phase-shift channel 3 of a dual-function transducer (not shown) and a digital phase demodulator 4. The $n$-speed transducer phase-shift channel 3 shifts the phase of $e_r(t)$ by an amount proportional to $\theta_0(t)$ to yield the signal $$e_0(t) = k_1 \sin[\omega_r t + n\theta_0(t)] \quad (8)$$

Digital phase demodulator 4 then quantizes $n\theta_0(t)$ into $m$ equal quanta per $2\pi$ electrical radians to generate the incremental output signals $\Delta\theta_0^+(t)$ and $\Delta\theta_0^-(t)$ already described. In addition, digital phase demodulator 4 generates the complementary logical signals $X_p(t)$ and $X_{pq}(t)$ and the logical signal $X_{pd}(t)$ which together identify the polarity and positive-slope zero crossings of $e_0(t)$. The signal $X_p(t)$ goes through a 0-to-1 transition in response to the first 1-to-0 transition of $C_2(t)$ after each zero crossing of $e_0(t)$ for which $\dot{e}_0(t) > 0$. Similarly, $X_p(t)$ goes through a 1-to-0 transition in response to the first 1-to-0 transition of $C_2(t)$ after each zero crossing of $e_0(t)$ for which $\dot{e}_0(t) < 0$. Whenever a transition of $X_p(t)$ occurs, a transition of $X_{pd}(t)$ having a slope of the opposite polarity occurs an interval $\tau$ later; otherwise, $X_{pd}(t)$ is invariant.

The sole mechanical input required by the present electronic encoder index is the shaft angle $\theta_0(t)$. A significant feature of index 5 permits this angle to vary without limit, although the index will respond identically to any two shaft angles which differ by an integral multiple of $2\pi$ mechanical radians. When first entered, the index quantum is defined to include the angle $\theta_0(t) = 0$.

Electronic encoder index 5 also requires an electrical input that is a periodic clock train in which an integral number of cycles $m$ occurs per cycle of $e_r(t)$ and in which a clock pulse is last true a fixed non-negative time after each zero crossing of $e_r(t)$ where $\dot{e}_r(t) > 0$. The characteristics of the clock train $C_1(t)$ generated by digital reference source 1 already discussed are sufficient to meet all clock signal requirements of electronic encoder index 5. All other electrical inputs required by encoder index 5 can be derived from the reference carrier $e_r(t)$, the phase-shifted carrier $e_0(t)$ and the clock signals $C_1(t)$ and $C_2(t)$. Because these additional index inputs are developed internally by either the digital reference source or position encoder chosen for use with electronic encoder index 5 in illustrating its operation, no additional components are needed for this purpose. The additional index inputs required have already been defined; they include the reference angle signal $X_r(t)$, the quantized phase-shifted logical carrier $X_p(t)$, the complement $X_{pq}(t)$ of $X_p(t)$, and the delayed complementary carrier $X_{pd}(t)$.

The principal outputs of encoder index 5 are the normally false motion command signals $X_i(t)$ and $X_d(t)$. The purposes of these signals are to indicate (1) whether $\theta_0(t)$ is within the index quantum and, if not, (2) in which direction $\theta_0(t)$ should be varied to reach the index quantum with minimum shaft motion. In the steady state, these signals are defined by the equations $$X_d(t) = \begin{cases} 1, & \frac{\pi}{mn} \leq \theta_0(t) \leq \theta_4 & (9a) \\ 0, & \theta_4 - 2\pi < \theta_0(t) < \frac{\pi}{mn} & (9b) \end{cases}$$

and $$X_i(t) = \begin{cases} 1, & \theta_4 - 2\pi < \theta_0(t) < -\frac{\pi}{mn} & (10a) \\ 0, & -\frac{\pi}{mn} \leq \theta_0(t) \leq \theta_4 & (10b) \end{cases}$$

The angle $\theta_4$ is a design parameter of the electronic encoder index which is normally adjusted to have the value $\pi$. Therefore, the state $X_d(t)=1$ indicates that negative (i.e. clockwise) variation of $\theta_0(t)$ is needed to reach the index position with minimum rotation, whereas the state $X_i(t)=1$ indicates that positive variation of $\theta_0(t)$ is required. The states $X_d(t)=X_i(t)=0$ indicates that $\theta_0(t)$ is within the index quantum.

Electronic encoder index 5 provides one other output, the coarse error modulus signal $X_e[\theta_0(t)]$. This signal quantizes $\theta_0(t)$ into two ranges of large or small absolute displacement from the index position. It thus provides information necessary to permit selection of an appropriate instantaneous shaft speed for an external actuator, dependent upon the absolute distance from the index position. The state $X_e=1$ indicates that a fast slewing speed can be used to conserve indexing time; otherwise, a shaft speed slow enough to prevent overshooting the index quantum should be employed. Normally, $X_e$ is adjusted so as to be true when $\theta_0(t)$ is within the range $$\pm \frac{\pi}{2n}$$

As shown in FIGURE 1, electronic encoder index 5 consists internally of a transducer index channel 6, a coarse index detector 7, and a fine index detector 8. Transducer index channel 6 is responsive to the shaft angle $\theta_0(t)$ and generates the analog output signals $e_{i1}[\theta_0(t)]$ and $e_{i2}[\theta_0(t)]$ as a function thereof from which (1) the limits of the index quantum can be identified, (2) ambiguity of the phase angle of $e_0(t)$ can be resolved, and (3) the error modulus signal $X_e$ can be derived.

Coarse index detector 7 converts the analog outputs $e_{i1}$ and $e_{i2}$ of transducer index channel 6 into the logical coarse motion command signals $$\overline{X}_{dc}[\theta_0(t)] \text{ and } \overline{X}_{ic}[\theta_0(t)]$$

In the range of large absolute error, as explained above, either $\overline{X}_{dc}$ or $\overline{X}_{ic}$ assumes a false state to indicate the direction of shaft rotation necessary to reach the index position with minimum motion. These two signals are defined by the equations $$\overline{X}_{dc} = \begin{cases} 1, & -\pi < \theta_0(t) < \frac{\pi}{2n} \quad (11a) \\ 0, & -\frac{\pi}{2\pi} \leq \theta_0(t) \leq \pi \quad (11b) \end{cases}$$

and $$\overline{X}_{ic} = \begin{cases} 1, & -\frac{\pi}{2n} \leq \theta_0(t) \leq \pi \quad (12a) \\ 0, & \pi < \theta_0(t) < -\frac{\pi}{2n} \quad (12b) \end{cases}$$

In addition, coarse index detector 7 generates the error modulus signal $X_e$ as discussed above.

Fine index detector 8 determines precisely when $\theta_0(t)$ lies within the index quantum defined by Equation 6 and generates the output signals $X_d(t) X_i(t)$ accordingly. Fine index detector 8 has two operating modes, selected in accordance with the absolute value of the instantaneous displacement from the index position. The mode is determined by the output signals from coarse index detector 7 so that fine index detector 8 operates in the primary mode associated with the angular range of small absolute error equal to $$\pm \frac{\pi}{2n}$$

and operates in the secondary mode associated with the angular range of large absolute error outside the range indicated above. Synchronized by the clock signal $C_1(t)$, fine index detector 8 performs the following functions:

(1) In the range of large absolute error, the output signals $X_d(t)=X_{dc}$ and $X_i(t)=X_{ic}$ are generated in response to the input signals from coarse index detector 7.

Figure 4:
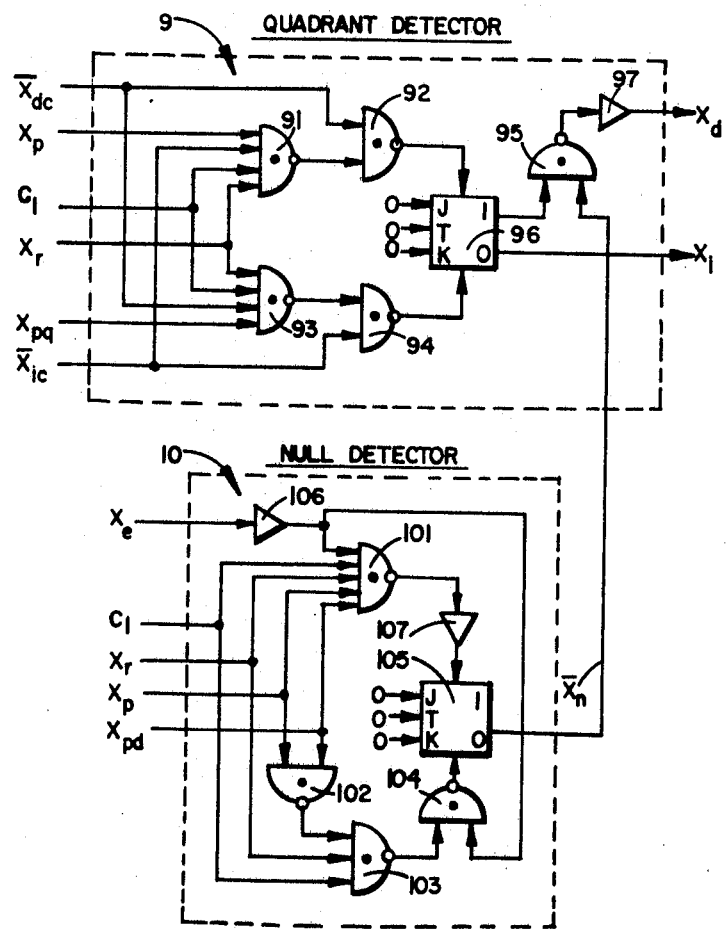
FIGURE 4 is a more detailed diagram of the fine index detector of the electronic encoder index.

(2) In the range of small absolute error, but excluding the index quantum in the case of $X_d(t)$, the steady-state output signals $X_d(t)$ and $X_i(t)$ defined by Equations 9a, 9b, 10a, and 10b, are controlled by a quadrant detector 9 shown in FIGURE 4. This component ascertains whether the phase angle $n\theta_0(t)$ of $e_0(t)$ lies in an upper quadrant (i.e. quadrant 1 or 2) or in a lower quadrant (i.e. quadrant 3 or 4) by determining the polarity of $e_0(t)$ each time $e_r(t)=0$. Specifically, the synchronized phase-shifted logical carriers $X_p(t)$ and $X_{pq}(t)$ are compared with the reference angle signal $X_r(t)$. Quadrant detector 9 classifies the phase quantum including 0 in quadrant 1 and that including $\pi$ electrical radians in quadrant 3.

(3) Within the index quantum, the output signal $X_d(t)$ is inhibited by a null detector 10 in fine index detector 8, also shown in FIGURE 4, to yield the steady-state output $X_d(t)=0$. Clocked by $C_1(t)$, null detector 10 compares the synchronized phase-shifted logical carriers $X_p(t)$ and $X_{pd}(t)$ with the reference angle signal $X_r(t)$.

Overall operation of electronic encoder index 5 can be illustrated by describing variation of the outputs and internal signals as the shaft angle $\theta_0(t)$ is increased from $$-\frac{\pi}{2} \text{ to } \frac{3\pi}{2}$$

radians by an external actuator. Initially, the state $X_e=1$ indicates a large enough displacement from the index position to warrant a high slewing speed. The signals $X_{dc}=0$ and $X_{ic}=1$ causes the output signals $X_d(t)=0$ and $X_i(t)=1$ to show that the index position can be reached with minimum motion by counterclockwise rotation. Fine index detector 8 is in the secondary mode since $\theta_0(t)$ is in the range of large absolute error.

As $\theta_0(t)$ is increased, the first variations of the signals mentioned occur as the encoder shaft enters the range of low absolute error at $$\theta_0(t) = -\frac{\pi}{2n}$$

Here a change to the state $X_e=0$ occurs to indicate the desirability of reducing shaft speed and to enable the null detection capability of fine index detector 8. In addition, transition to the state $X_{ic}=0$ occurs. Consequently, fine index detector 8 now operates in the primary mode with the outputs $X_d(t)$ and $X_i(t)$ determined solely by the component $n\theta_0(t)$ of the phase angle of $e_0(t)$. The outputs $X_d(t)=0$ and $X_i(t)=1$ continue to exist because $n\theta_0(t)$ is still within the fourth quadrant. As $\theta_0(t)$ continues to increase, the output states $$X_d(t)=X_i(t)=0$$

exist shortly after $\theta_0(t)$ reaches $$-\frac{\pi}{mn}$$

thereby entering the index quantum. Within fine index detector 8, quadrant detector 9 interprets traversing this angle as motion from the fourth to the first quadrant tending to generate the output states $X_d(t)=1$ and $X_i(t)=0$. However, within the index quantum, null detector 10 inhibits $X_d(t)$ to yield the proper index output.

When $\theta_0(t)$ increases through $\pi/mn$, thereby leaving the index quantum, null detector 10 soon ceases to inhibit $X_d(t)$. Consequently, because $n\theta_0(t)$ is within the first quadrant and within the angular range of low absolute error, the output states $X_d(t)=1$ and $X_i(t)=0$ are generated by fine index detector 8. These output states indicate that the index position can now be reached with minimum motion by clockwise rotation. Increasing $\theta_0(t)$ still further through $\pi/2n$ results in again entering the range of large absolute error wherein $X_e=1$, thereby disabling the null detection function of fine index detector 8. In addition, $X_{dc}$ goes true thereby disabling the quadrant detection function of fine index detector 8. Fine index detector 8 is now again in the secondary mode with $\overline{X}_{dc}$ and $\overline{X}_{ic}$ in complete control of $X_d(t)$ and $X_i(t)$ which do not change at this time. Again increasing $\theta_o(t)$ through $\pi$ results in $\overline{X}_{dc}$ and $\overline{X}_{ic}$ changing states thereby also causing both $X_d(t)$ and $X_i(t)$ to change states. It is thus properly indicated by the outputs $X_d(t)=0$ and $X_i(t)=1$ that the shortest path to the index position now requires counterclockwise motion. Further increasing $\theta_o(t)$ until the encoder shaft angle coincides with its original position at $3\pi/2$ results in no additional variation of the signals $\overline{X}_{dc}$ and $\overline{X}_{ic}$ or the outputs $X_d(t)$ and $X_i(t)$ which these signals control in this angular range. Similarly, $X_e$ remains true. Continuing to increase $\theta_o(t)$ monotonically would repeat the above cycle with a period of $2\pi$. Similarly, decreasing $\theta_o(t)$ monotonically would reverse the above described cycle.

The operation of the components of electronic encoder index 5 shown in FIGURE 1 will now be described in detail after a discussion of the pertinent characteristics of the logic elements from which these components are synthesized. The physical inputs and outputs of a logic element are typically voltages. Between transitions, circuit design permits such a voltage to assume only two possible values, each confined by a separate set of limits. Depending upon which set of limits the voltage is between, the logical signal that the voltage represents is defined at true or false (i.e., as logical 1 or 0). It is the logical variable which an input or output voltage represents that appears in the equations and the discussions herein.

All gates used are of the NAND (i.e. "not AND") type described in the literature (ref.: Montgomery Phister, Jr., Logical Design of Digital Computers, New York, John Wiley and Sons, Inc., 1959, p. 23). A gate of this type produces a false output if, and only if, all inputs are simultaneously true. A NAND gate may consist of a diode AND gate connected to the input of a logical inverter.

All flip-flops are of the clocked JK type (ref.: Montgomery Phister, Jr., Logical Design of Digital Computers, supra, pp. 128–129, 134–135). Such a flip-flop may be synthesized from a conventional toggle flip-flop having a single capacitively coupled input. It is only necessary to break the common connection of the input capacitors and to connect each capacitor to a simple two-input diode gate so connected that a clock pulse applied to one gate input reaches the gate output only if the other gate input is true. A true input at the J input terminal places the flip-flop in a true state so that a 1 appears at the 1 output terminal and a 0 appears at the 0 output terminal. A true input at the K input terminal places the flip-flop in a false state so that a 0 appears at the 1 output terminal and a 1 appears at the 0 output terminal. A 1-to-0 transition at the T input terminal triggers the element. Each flip-flop is equipped with an override set and an override re-set input. When true, an override input controls the state of the flip-flop regardless of the states of the trigger and enabling inputs. The permissible states of the override inputs are such that both inputs cannot be true at the same time. Moreover, normal logical design prevents an override input from going false during a clock pulse. In addition, as soon as one of the override inputs goes true, the flip-flop is triggered immediately. Thus, a flip-flop responds at the leading edge of an override pulse.

Figure 2:
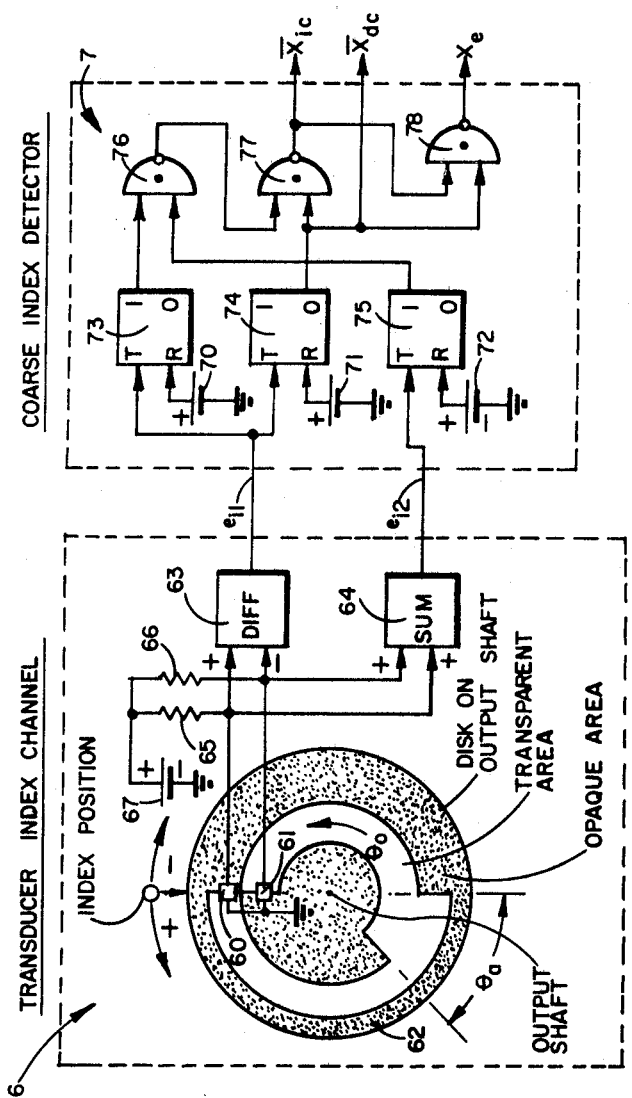
FIGURE 2 is a more detailed diagram of the transducer index channel and the coarse index detector of the electronic encoder index.

Element 73 in FIGURE 2 is typical of the level detecting triggers employed. Each trigger has a pair of inputs and a pair of outputs and is responsive to the difference between the signals at its inputs to convert an analog control input into logical outputs. In other words, when the analog signal input at the T input terminal is equal to or greater than the analog voltage at the R input terminal, a 1 appears at the 1 output terminal and a 0 appears at the 0 output terminal. Conversely, if the analog signal input at the T input terminal is less than the analog voltage at the R input terminal, a 0 appears at the 1 output terminal and a 1 appears at the 0 output terminal. In this manner, the instantaneous values of the two logical outputs are mutually complementary. A conventional circuit design may be employed to construct such level detecting triggers and appropriate adjustment of the parameters made to obtain the required value of the voltage at the R input terminal (ref.: Samuel Weber, Modern Digital Circuits, New York, McGraw-Hill Book Company, Inc., 1964, pp. 38–41, FIGURE 2b).

Figure 3:
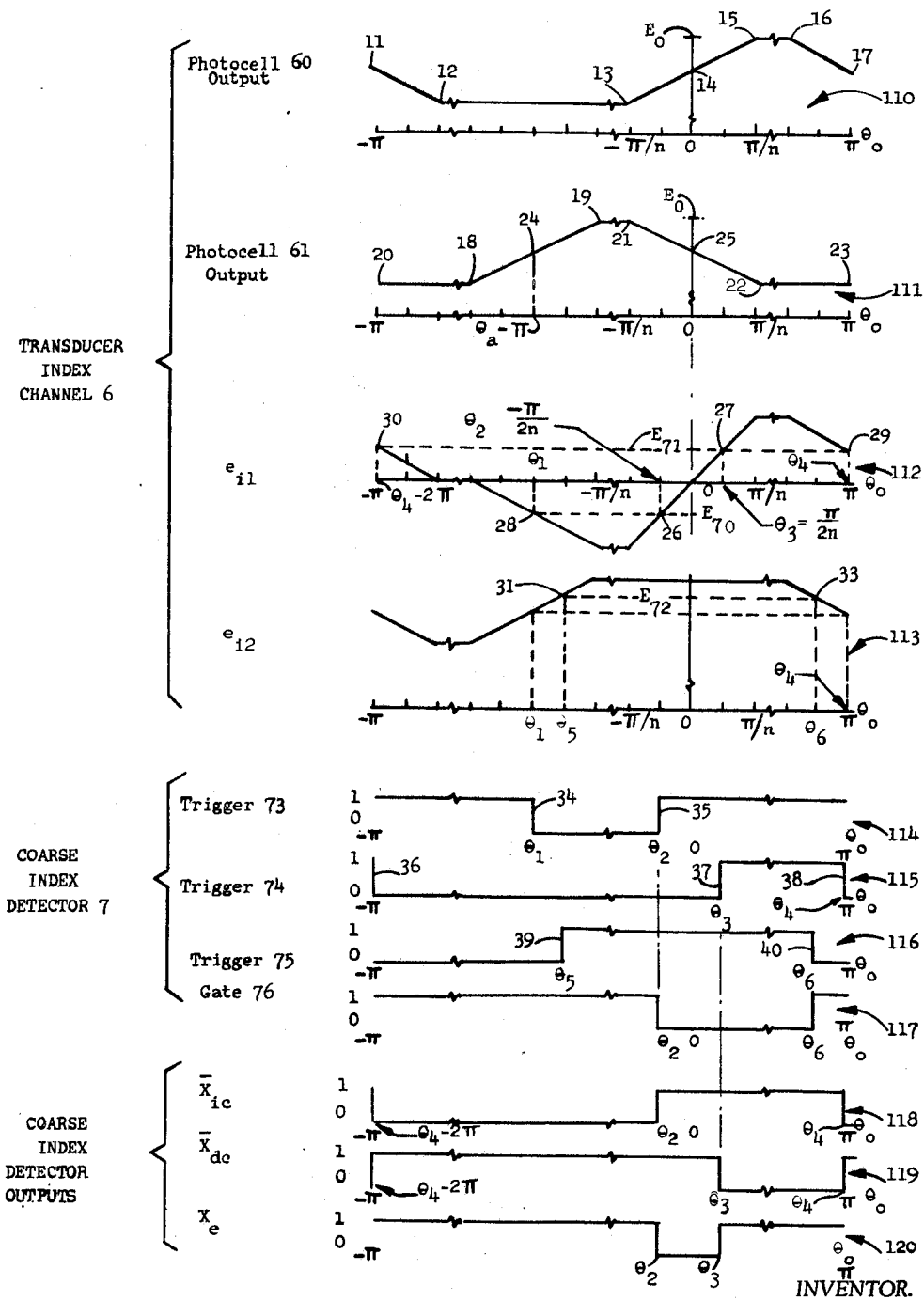
FIGURE 3 shows a series of waveforms useful in explaining the operation of the transducer index channel and the coarse index detector.

Operation of the components of encoder index 5 shown in FIGURE 1 will now be described in detail with reference to FIGURE 2, which shows the logic diagrams of transducer index channel 6 and coarse index detector 7. Reference will also be made to FIGURE 3 which shows waveforms useful in explaining the operation of the components of FIGURE 2.

Index channel 6 consists of identical, or identically trimmed, photoconductive cells 60 and 61 which are illuminated through a rotor 62 as a function of the shaft angle $\theta_o(t)$. One terminal of each of cells 60 and 61 is connected to ground. The respective output voltages on the other terminals of photocells 60 and 61 are applied to a subtractor circuit 63 and to an adder circuit 64 which provide the output voltages $e_{i1}$ and $e_{i2}$ of transducer index channel 6.

As shown in FIGURE 2, rotor 62 is a transparent disc partially covered with an opaque coating. Disc 62 is rigidly mounted on the transducer shaft, perpendicular to the rotational axis and concentric with it. Sectors of two transparent rings extend in opposite directions from a common radius, and the inner circular boundary of one ring is coincident with the outer circular boundary of the other. From the common radius, the outer transparent sector extends $\pi$ radians counterclockwise and the inner transparent sector extends $\pi+\theta_a$ radians clockwise. The angle $\theta_a$ is adjusted to be greater than 0 so that electronic encoder index 5 is capable of distinguishing the index position from a position $\pi$ radians from the index position. A suitable value for $\theta_a$ is $\pi/4$. Both ring sectors have the same radial width, sufficient to completely expose a photocell. By placing an additional pattern thereon, disc 62 may also be used as the rotor for transducer phase-shift channel 3 (ref.: Charles E. Lenz, "Analysis of a Miniature Encoder for Arc-Second Measurements in Avionic Systems," supra, pp. 3–7, 13–18).

As shown in FIGURE 2, stationary photocells 60 and 61 are mounted near disc 62 opposite the outer and inner transparent ring sectors, respectively, with their sensitive elements oriented toward disc 62. If one were to draw two radii tangential to the projection of the photosensitive area of either photocell 60 or 61 on rotor disc 62, the radii would typically include an angle of at least $2\pi/n$. In addition, photocells 60 and 61 are so located that a line passing through the center of each would intersect the transducer shaft axis. A collimated beam of light is directed perpendicular to disc 62 in such a manner that it passes through disc 62 and fully illuminates each of photocells 60 and 61 whenever the position of rotor 62 is appropriate. Conversely, each photocell is completely masked throughout a certain range of disc positions. Thus, the total luminous flux striking each photocell is a function of the shaft angle $\theta_o(t)$. In this manner, the centers of photocells 60 and 61 define the index or reference position. In other words, each photocell is so located that when the shaft angle $\theta_o(t)$ is at the center of the index quantum, the transparent disc sector associated with that photocell permits illumination of half of the photocell.

The output terminals of photocells 60 and 61 are also connected through resistors 65 and 66, respectively, to a positive constant voltage source 67 of voltage $E_o$. Thus, each photocell and its associated series resistor forms a variable voltage divider across source 67. The output voltages of photocells 60 and 61 are obtained from the ungrounded terminals thereof in such a manner that increasing the luminous flux on either photocell causes its output voltage to decrease. The output voltages are applied to circuits 63 and 64, the former being operative to provide the difference between the output voltages and the latter being operative to provide the sum of the output voltages.

Waveforms relating to transducer index channel 6 are shown in FIGURE 3. The output of photocell 60 is shown as waveform 110, the output of photocell 61 is shown as waveform 111, the output of subtractor circuit 63, $e_{11}$, is shown as waveform 112 and the output of adder circuit 64, $e_{12}$, is shown as waveform 113. Photocells whose projections on transducer disc 62 subtend angles of $2\pi/n$ are assumed. Photocell output voltages which result as the shaft angle $\theta_o(t)$ increases monotonically from $-\pi$ to $\pi$ radians, or through one complete revolution of the input shaft, are shown. These voltages increase or decrease in an approximately linear manner during the angular interval that a transition from opaque to transparent area is traversing each photocell. When $\theta_o(t)=-\pi$, half of the maximum luminous flux strikes photocell 60 as shown at 11. As $\theta_o(t)$ increases, this flux increases for the first $\pi/n$ of motion, causing the output voltage to decrease to the minimum level at 12. With photocell 60 fully illuminated, the output voltage therefrom remains constant until $$\theta_o(t) = -\frac{\pi}{n}$$

at 13. The luminous flux then decreases to half of the maximum value at $\theta_o(t)=0$ and to 0 at $\theta_o(t)=\pi/n$, leading to the respective corresponding values of the output voltages shown at 14 and 15, where the output voltage at 15 closely approaches the voltage $E_o$ of source 67. With photocell 60 now completely dark, the output voltage therefrom remains constant until $$\theta_o(t) = \frac{\pi(n-1)}{n}$$

at 16. With increasing luminous flux, the output voltage from photocell 60 then decreases until, at $\theta_o(t)=\pi$, it returns to its initial value at 17.

The output voltage of photocell 61 varies similarly, but the points of inflection appear at different values of $\theta_o(t)$. Certain of these points, namely points 18 and 19 in FIGURE 3, depend upon the angle $\theta_a$ shown in FIGURE 2. Referring to waveform 111, photocell 61 is initially fully illuminated at $\theta_o(t)=-\pi$ shown at 20. As $\theta_o(t)$ increases monotonically, the output voltage remains constant until $$\theta_o(t) = \theta_a - \frac{\pi(n+1)}{n}$$

at 18, rises until $$\theta_o(t) = \theta_a - \frac{\pi(n-1)}{n}$$

at 19 where photocell 61 is completely dark, remains at the value $E_o$ until $$\theta_o(t) = -\frac{\pi}{n}$$

at 21, decreases until photocell 61 is fully illuminated at $\theta_o(t)=\pi/n$ at 22, and again remains constant until the shaft coincides with its initial position at 23. It is significant that half of photocell 61 is illuminated at $\theta_o(t)=\theta_a-\pi$ at 24 and at $\theta_o(t)=0$ at 25.

Because the output voltages $e_{11}$ and $e_{12}$ of transducer index channel 6 result from subtracting and adding the linearly varying voltages from photocells 60 and 61, variations of $e_{11}$ and $e_{12}$ are also approximately linear. The voltage $e_{11}$ shown as waveform 112 is used to identify the limits of the angular range $$\pm\frac{\pi}{2n}$$

of small absolute error and the angle $\theta_o(t)=\pi$ at which the ranges of counterclockwise and clockwise motion commands are contiguous. These three angles are ultimately identified by utilizing triggers to compare $e_{11}$ with two reference voltages $E_{70}$ and $E_{71}$ such that $E_{70}=e_{11}$ when $$\theta_o(t) = -\frac{\pi}{2n}$$

and $E_{71}=e_{11}$ when $\theta_o(t)=\pi/2n$. In FIGURE 3, $e_{11}$ is shown as waveform 112 and the voltages $E_{70}$ and $E_{71}$ are shown superimposed thereon. It can be seen that $e_{11}=E_{70}$ at 26 and $e_{11}=E_{71}$ at 27. In addition, however, two additional angles, $\theta_1$ and $\theta_4$, exist for which $e_{11}=E_{70}$ or $E_{71}$ as as shown at 28 and 29. Furthermore, due to the cyclic nature of $e_{11}$, $e_{11}$ also equals $E_{71}$ at $\theta_4-2\pi$ at 30. Therefore, an additional signal is required to distinguish between points 26 and 27 and points 28, 29 and 30. The voltage $e_{12}$, shown as waveform 113 in FIGURE 3, performs this function.

The signal $e_{12}$ ultimately controls a trigger with a threshold level of $E_{72}$. This trigger must assume complementary states throughout each of the two angular ranges specified above. Consequently, it is necessary to adjust $E_{72}$, which is shown superimposed on waveform 113 in FIGURE 3, to satisfy the relation $$e_{12}[\theta_1] < E_{72} = e_{12}[\theta_5] = e_{12}[\theta_6] \leq e_{12}[0] \quad (13)$$

as shown at 31 and 32 in FIGURE 3, where to uniquely identify each of the two angular ranges specified above, the additional relations $$\theta_1 < \theta_5 < \theta_2 \quad (14)$$

and $$\theta_3 \leq \theta_6 \leq \theta_4 \quad (15)$$

must be satisfied.

The logic diagram of coarse index detector 7 which converts the analog shaft angle signals from transducer index channel 6 into digital outputs is also shown in FIGURE 2. Coarse index detector 7 consists of three triggers 73, 74 and 75, which convert the analog signals $e_{11}$ and $e_{12}$ directly into corresponding logical signals, including the coarse detector output $\overline{X}_{dc}$. In addition, coarse index detector 7 utilizes three NAND gates 76, 77 and 78 to convert the trigger output signals into the remaining coarse detector outputs $\overline{X}_{ic}$ and $X_e$.

Coarse index detector 7 is a completely asynchronous component. Consequently, particular attention must be given to avoiding timing problems which could result in instantaneously incorrect outputs. As a result, and in accordance with the teachings of the present invention, a design is employed in which the states of no two triggers change in response to variation of $\theta_o(t)$ through the same value.

In order to perform the functions specified, $e_{11}$ is applied to the T input terminals of triggers 73 and 74, whereas $e_{12}$ is applied to the T input terminal of trigger 75. Trigger 73 receives, at its R input terminal, the voltage $E_{70}$ from a constant voltage source 70. Similarly, triggers 74 and 75 receive, at their R input terminals, the voltages $E_{71}$ and $E_{72}$, respectively, from constant voltage sources 71 and 72, respectively. The 1 output terminal of trigger 73 is coupled to a first input of gate 76. The 1 output terminal of trigger 75 is coupled to a second input of gate 76. The output of gate 76 is coupled to a first input of gate 77 which receives, as its second input, the signal from the 0 output terminal of trigger 74. The output of gate 77 is coupled to a first input of gate 78 which receives, as its second input, the signal from the 0 output terminal of trigger 74. $\overline{X}_{dc}$ is derived from the 0 output terminal of trigger 74, $\overline{X}_{ic}$ is derived from the output of gate 77, and $X_e$ is derived from the output of gate 78. The reference or threshold voltages $E_{70}$, $E_{71}$ and $E_{72}$ from voltage sources 70, 71 and 72 establish the respective levels at which triggers 73, 74 and 75 change state. These voltages are adjusted in accordance with well known techniques to satisfy the requirements specified above.

Waveforms showing the response of coarse index detector 7 to a monotonic increase of the shaft angle $\theta_o(t)$ from $-\pi$ to $\pi$ are shown in FIGURE 3. The outputs of triggers 73, 74 and 75 are shown as waveforms 114, 115, and 116, respectively, the output of gate 76 is shown as waveform 117, the outputs of gates 77 and 78, $\overline{X}_{1c}$ and $X_e$ are shown as waveforms 118 and 120, respectively, and $\overline{X}_{dc}$ is shown as waveform 119. Initially, triggers 73 and 74 are true and trigger 75 is false. Triggers 73 and 74 respond solely to variation of $e_{11}$ through the levels $E_{70}$ and $E_{71}$, respectively. As a result, trigger 73 goes false at 34 in response to the decrease of $e_{11}$ through $E_{70}$ at the shaft angle $\theta_o(t)=\theta_1$ at 28. Trigger 73 returns to the true state at 35 in response to the rise of $e_{11}$ to $E_{70}$ at $\theta_o(t)=\theta_2$ at 26. Trigger 74 goes false at 36 as soon as the shaft angle $\theta_o(t)$ exceeds $-\pi$ causing the signal $e_{11}$ to decrease to less than the voltage level $E_{71}$ at 30. Trigger 74 then goes true again at 37 as $e_{11}$ rises to $E_{71}$ at $\theta_o(t)=\theta_3$ at 27. If the shaft angle $\theta_o(t)$ increases beyond $\theta_4=\pi$, trigger 74 will go false at 38 as the signal $e_{11}$ falls below the level $E_{71}$ at 29.

Trigger 75 responds only to variation of the signal $e_{12}$ through the level $E_{72}$. Thus, trigger 75 goes true at 39 in response to the rise of $e_{12}$ to level $E_{72}$ at $\theta_o(t)=\theta_5$ at 31. Similarly, trigger 75 again goes false at 40 in response to the decrease of $e_{12}$ through the level $E_{72}$ at $\theta_o(t)=\theta_6$ at 32.

The signal outputs of triggers 73 and 74, shown as waveforms 114 and 115, respectively, provide the logical transitions necessary at the shaft angles $$\theta_2 = -\frac{\pi}{2n}$$

at 35, $\theta_3=\pi/2n$ at 37, and $\theta_4=\pi$ at 36 and 38 to synthesize the coarse detector outputs $\overline{X}_{1c}$, $\overline{X}_{dc}$ and $X_e$ shown in waveforms 118, 119 and 120, respectively. However, of all the trigger outputs, only the complement of the output of trigger 74 can be utilized directly to provide a coarse detector output, viz the clockwise coarse motion command signal $\overline{X}_{dc}$. To synthesize the counterclockwise coarse motion command signal $\overline{X}_{1c}$, the outputs of triggers 73 and 75 are first combined in gate 76, so as to distinguish between the transitions of trigger 73 at points 34 and 35. In addition, gate 77 generates the signal $\overline{X}_{1c}$ by combining the output signal from gate 76 with the complement output of trigger 74 so as to provide a 1-to-0 transition of $\overline{X}_{1c}$ at $\theta_4=\pi$ rather than at $\theta_6$. Gate 78 then combines the signals $\overline{X}_{dc}$ and $\overline{X}_{1c}$ to obtain the coarse error modulus signal $X_e$.

Figure 5:
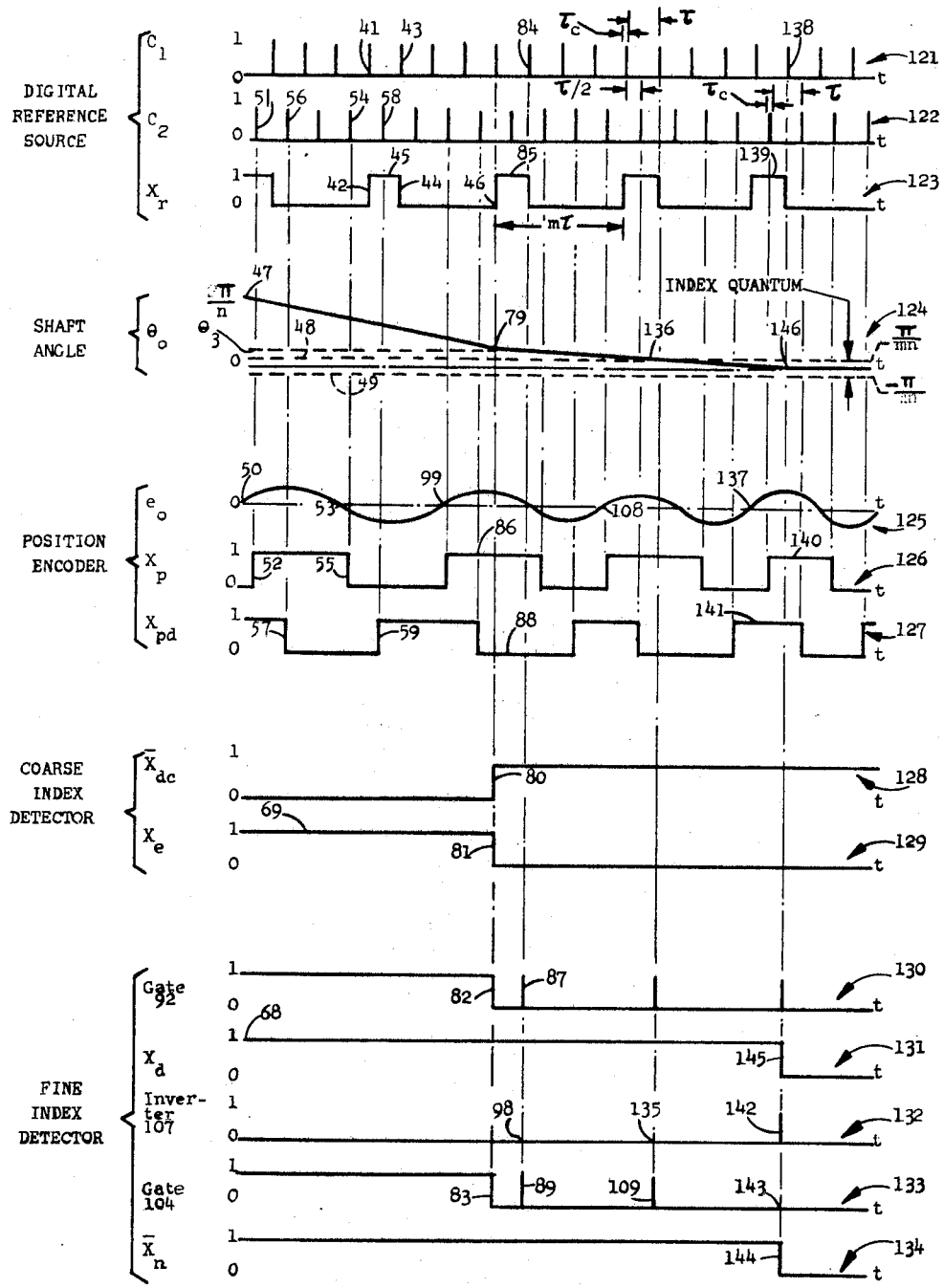
FIGURE 5 shows a series of waveforms useful in explaining the operation of the fine index detector.

Reference will now be made to FIGURE 4 which shows the logic diagram of fine index detector 8 which identifies the exact position of the index quantum after its general location by coarse index detector 7. Reference will also be made to FIGURE 5 which shows waveforms useful in explaining the operation of the components of FIGURE 4. Clocked by $C_1(t)$, fine index detector 8 is the only component of electronic encoder index 5 ever to operate synchronously. It has two operating modes selected automatically in response to the shaft angle $\theta_o(t)$. Fine index detector 8 operates in the primary mode for values of $\theta_o(t)$ from $\theta_2$ to $\theta_3$ and in the secondary mode throughout the remaining angular range. Fine index detector 8 consists of a quadrant detector 9 and a null detector 10. Each will be described separately.

Quadrant detector 9 responds to the logical input signals $C_1(t)$, $X_p(t)$, $X_{pq}(t)$, $\overline{X}_{dc}$, $\overline{X}_{1c}$, $X_r(t)$, and the null-detector output $\overline{X}_n(t)$. From these input signals, quadrant detector 9 determines the direction in which the transducer shaft must be rotated to reach the index quantum with minimum motion for all possible values of the shaft position $\theta_o(t)$. It is designed to indicate this information by appropriate variation of the outputs $X_d(t)$ and $X_i(t)$.

Quadrant detector 9 consists of NAND gates 91, 92, 93, 94 and 95, a flip-flop 96 and an inverter 97. Gate 91 receives as its inputs the signals $X_p(t)$, $\overline{X}_{1c}$, $C_1(t)$, and $X_r(t)$. Gate 92 receives as its inputs the output of gate 91 together with the signal $\overline{X}_{dc}$. Gate 93 receives as its inputs the signals $X_r(t)$, $C_1(t)$, $\overline{X}_{dc}$, and $X_{pq}(t)$. Gate 94 receives as its inputs the output of gate 93 together with the signal $\overline{X}_{1c}$. Flip-flop 96 receives at its J, T and K input terminals signals of fixed logical value 0, so that flip-flop 96 responds solely to the override inputs. The output of gate 92 is applied to the override set terminal of flip-flop 96 whereas the output of gate 94 is applied to the override re-set terminal. The 0 output terminal of flip-flop 96 provides the output signal $X_i(t)$. The 1 output terminal of flip-flop 96 is coupled to a first input of gate 95 which receives, as its second input, the signal $\overline{X}_n(t)$ from null detector 10. The output of gate 95 is coupled to the input of inverter 97 whose output is the signal $X_d(t)$.

In the primary mode, quadrant detector 9 responds to the component $n\theta_o(t)$ of the output carrier $e_o(t)$ of transducer phase-shift channel 3. It essentially samples the polarity of $e_o(t)$ an interval $\tau/2$ after each zero crossing of the reference carrier $e_r(t)$ at which $\dot{e}_o(t) > 0$. If the sampled value of $e_o(t)$ is $\geq 0$, flip-flop 96 is placed or retained in the true state by the succeeding $C_1(t)$ pulse in order to indicate that the phase angle $n\theta_o(t)$ was last sampled in an upper quadrant (i.e. in quadrant 1 or 2). Otherwise, flip-flop 96 is placed or remains in the false state to indicate that $n\theta_o(t)$ was last sampled in a lower quadrant (i.e. quadrants 3 or 4). Except within the index quantum where the quadrant detector input $\overline{X}_n(t)=0$, the normal and complement outputs of flip-flop 96 are transmitted to the quadrant detector outputs $X_d(t)$ and $X_i(t)$, respectively, the former signal through gate 95 and inverter 97.

In the primary mode, the coarse motion command iputs $\overline{X}_{dc}$ and $\overline{X}_{1c}$ are both true. In addition, the reference angle signal $X_r(t)$ is true for the first period of duration $\tau$ bounded by 1-to-0 transitions of $C_1(t)$ immediately succeeding each occurrence of the condition $e_r(t)=0$. As a result, flip-flop 96 may be operated by transmitting the $C_1(t)$ pulse which terminates each such clock period to either the override set or override re-set inputs thereof depending on the state of the signal $X_p(t)$. For the duration of this clock pulse, $X_p(t)=1$ if, and only if, the phase angle $n\theta_o(t)$ was last sampled in quadrant 1 or quadrant 2. Conversely, $X_{pq}(t)=1$ if, and only if, $n\theta_o(t)$ was last sampled in quadrants 3 or 4. Consequently, in the steady state, the output $X_o(t)$ of flip-flop 96 has the values $$X_o(t) = \begin{cases} 1, & -\dfrac{\pi}{mn} \leq \theta_o(t) < \theta_3 \quad (16a) \\ 0, & \theta_2 \leq \theta_o(t) < -\dfrac{\pi}{mn}. \quad (16b) \end{cases}$$

Thus, early in each cycle of $e_r(t)$, a clock pulse causes flip-flop 96 to be changed to or to remain in the necessary state to generate the proper outputs.

In the secondary mode, quadrant detector 9 no longer responds to the phase of the carrier $e_o(t)$. Instead, the coarse motion commands $\overline{X}_{dc}$ and $\overline{X}_{1c}$ control the state of flip-flop 96 through gates 92 and 94 in such a manner that the complements of these two inputs appear at the motion command outputs $X_d(t)$ and $X_i(t)$, respectively.

The logic diagram of null detector 10 is also shown in FIGURE 4. Null detector 10 responds to the logical input signals $C_1(t)$, $X_p(t)$, $X_{pq}(t)$, $X_e$, and $X_r(t)$. From these signals null detector 10 synthesizes the steady state output signal $$\overline{X}_n(t) = \begin{cases} 1, \dfrac{\pi}{mn} \leq \theta_o(t) < \dfrac{\pi(2mn-1)}{mn} & (17a) \\ 0, -\dfrac{\pi}{mn} \leq \theta_o(t) < \dfrac{\pi}{mn} & (17b) \end{cases}$$

to prevent an incorrect steady state output from being generated by quadrant detector 9 when the transducer shaft is within the index quantum. This function is necessary because quadrant detector 9 interprets the index quantum to be in an upper quadrant and responds by placing flip-flop 96 in the true state. Consequently, if the signal $\overline{X}_n(t)$ remained true within the index quantum, an incorrect steady-state clockwise motion command $X_d(t)=1$ would be generated, and identification of the index quantum would be impossible. The output of null detector 10, $\overline{X}_n(t)$, prevents such incorrect operation by inhibiting $X_d(t)$ within the index quantum to cause the correct steady-state quadrant detector output $X_d(t)=0$ to be generated.

Null detector 10 consists of gates 101, 102, 103 and 104, a flip-flop 105, and inverters 106 and 107. The coarse error modulus signal $X_e$ is applied to inverter 106, the output of which is applied as first inputs to gates 101 and 104. Gate 101 receives, as its other inputs, the signals $C_1(t)$, $X_r(t)$, $X_p(t)$, and $X_{pd}(t)$. The output of gate 101 is applied to inverter 107, the output of which is applied to the override set input terminal of flip-flop 105. Gate 102 receives as its inputs the signals $X_p(t)$ and $X_{pd}(t)$. Gate 103 receives as its inputs the signals $C_1(t)$ and $X_r(t)$ together with the output of gate 102. The output of gate 103 is applied as the second input to gate 104, the output of which is applied to the override re-set terminal of flip-flop 105. The J, T and K input terminals of flip-flop 105 receive signals of fixed logical value 0. The signal $\overline{X}_n(t)$ is derived from the zero output terminal of flip-flop 105. Because the inputs to the J, T and K input terminals of flip-flop 105 are all zero, flip-flop 105 responds solely to the override inputs derived from input gates 101–104 in conjunction with inverters 106 and 107.

In the primary mode, null detector 10 responds to the phase angle $n\theta_0(t)$ of the carrier $e_0(t)$ to determine whether or not the shaft angle $\theta_0(t)$ lies within the angular range of the index quantum. Null detector 10 responds to every positive-slope zero crossing of the reference carrier $e_r(t)$ in the primary mode. When a positive-slope zero crossing of the carrier $e_0(t)$ occurs within an interval of $$\mp \frac{\tau}{2}$$

closed on the right, of such a positive-slope zero crossing of $e_r(t)$, an output signal $\overline{X}_n(t)=0$ is generated; otherwise, the output $\overline{X}_n(t)=1$ is produced.

Waveforms showing operation of fine index detector 8 in conjunction with digital reference source 1, position encoder 2 and other components of electronic encoder index 5 are shown in FIGURE 5. These waveforms show variations of significant quantities with time corresponding to a typical indexing operation in which the original shaft position makes clockwise rotation necessary to reach the index quantum with minimum motion. Control of the speed and direction of shaft rotation in response to the output signals of electronic encoder index 5 is shown which causes the encoder shaft to reach a steady-state position within the index quantum.

The outputs of digital reference source 1, $C_1(t)$, $C_2(t)$, and $X_r(t)$ are shown as waveforms 121, 122 and 123, respectively, in FIGURE 5. Each clock signal is a normally false pulse train of period $\tau$ consisting of pulses of duration $\tau_c$. For clarity, clock signals are shown for which the pulse duration to width ratio $\tau_c/\tau$ is very small. the signal $X_r(t)$ goes true for one period of $C_1(t)$ immediately after each occurrence of the condition $e_r(t)=0$ to yield a train of pulses of duration $\tau$. In a typical case, the 1-to-0 transition of $C_1(t)$ at 41 causes $X_r(t)$ to go true at 42, and the following 1-to-0 transition of $C_1(t)$ at 43 causes $X_r(t)$ to return to its normally false state at 44, resulting in a pulse of duration $\tau$ at 45. Adjacent leading edges of $X_r(t)$ pulses, such as those at 42 and 46, are displaced by a period $m\tau$, where the integer $m$ is a design parameter of digital reference source 1, as explained previously. In the case shown, the relatively low value $m=4$ is employed to simplify explanation of the indexing operation, although much larger values of $m$ are typical.

The variation of the shaft angle $\theta_0(t)$ with time is shown as waveform 124 in FIGURE 5. The actual torque utilized to vary $\theta_0(t)$ is supplied by an independent external means, the internal operation of which is not germain to an explanation of the functioning of electronic encoder index 5. Here it is assumed only that this external source of torque will respond solely to the outputs $X_e$, $X_d(t)$, and $X_i(t)$ of electronic encoder index 5 in determining the direction and speed of shaft rotation to be supplied. The original shaft position which appears at 47 is $\theta_0(t)=2\pi/n$, where the positive integer $n$ is the speed of the associated transducer phase-shift channel, as explained previously. The upper and lower boundaries of the index quantum are shown at 48 and 49, respectively.

The signals $e_0(t)$, $X_p(t)$, and $X_{pd}(t)$ originating within position encoder 2 appear as waveforms 125, 126 and 127, respectively. The state of the quantized phase-shifted logical carrier $X_p(t)$ is controlled by the polarity of $e_0(t)$ and synchronized by 1-to-0 transitions of $C_2(t)$, with the true and false states of $X_p(t)$ corresponding to non-negative and negative values of $e_0(t)$, respectively. Thus, when $e_0(t)$ goes positive at 50, $X_p(t)$ responds to the next 1-to-0 tranistion of $C_2(t)$ at 51 by going true at 52. Similarly, when $e_0(t)$ goes negative at 53, $X_p(t)$ responds to the next 1-to-0 transition of $C_2(t)$ at 54 by returning to the false state at 55. The delayed complementary phase-shifted logical carrier $X_{pd}(t)$ assumes a state opposite to that of $X_p(t)$ starting a period $\tau$ after each transition of the latter signal. Thus, when $X_p(t)$ goes true at 52, $X_{pd}(t)$ responds to the next 1-to-0 transition of $C_2(t)$ at 56 by going false at 57. Similarly, when $X_p(t)$ goes false at 55, $X_{pd}(t)$ responds to the next 1-to-0 transition of $C_2(t)$ at 58 by going true at 59.

All remaining signals shown in FIGURE 5 are generated within electronic encoder index 5. Waveforms 128 and 129, respectively, are the clockwise coarse motion command $\overline{X}_{dc}$ and the coarse error modulus signal $X_e$, respectively, which originate in coarse index detector 7. The corresponding counterclockwise coarse motion command $\overline{X}_{lc}$ is not shown because it remains true continuously in the present illustration. The output of gate 92 and the clockwise motion command $X_d(t)$ generated within quadrant detector 9 of fine index detector 8 are shown as waveforms 130 and 131, respectively. As in the case of $\overline{X}_{lc}$, the output of gate 94 and the counterclockwise motion command $X_i(t)$ are not shown because they remain false continuously in the present illustration. The output of inverter 107, the output of gate 104, and the signal $\overline{X}_n(t)$ generated by null detector 10 of fine index detector 8 appear as waveforms 132, 133 and 134, respectively.

Because initially $X_d(t)=1$ at 68, clockwise rotation is required to decrease the shaft angle $\theta_0(t)$ in order to reach the index quantum with minimum absolute motion. Because initially the state $X_e=1$ also exists at 69, a fast-slewing speed is appropriate. Consequently, $\theta_0(t)$ is decreased rapidly as shown in waveform 124 until it reaches $\theta_3$ at 79.

When $\theta_0(t)$ passes through the value $\theta_3$ at 79, two signals respond directly in an asynchronous manner: $\overline{X}_{dc}$ goes true at 80 and $X_e$ goes false at 81. Moreover, the outputs of gates 92 and 104 respond immediately to the transitions of $\overline{X}_{dc}$ at 80 and $X_e$ at 81, respectively, by going false at 82 and 83. In addition, the 1-to-0 transition of $X_e$ at 81 indicates the desirability of decreasing the shaft speed to avoid overshoot due to the proximity of the shaft angle to the index quantum. Consequently, a lower value of the shaft speed is employed after 79.

Once the output of gate 92 goes false at 82, quadrant detector 9 becomes responsive to the phase of the carrier $e_0(t)$ shown in waveform 125. When this condition exists, each $C_1(t)$ pulse which occurs when both $X_r(t)$ and $X_p(t)$ are true, appears in the signal output of gate 92. These pulses in the output of gate 92 indicate that the phase angle $n\theta_0(t)$ of $e_0(t)$ is in an upper quadrant or in the index quantum, a condition which exists at all times in FIGURE 5 after the output of gate 92 goes false. In a typical case, during the $C_1(t)$ pulse at 84, both $X_r(t)$ at 85 and $X_p(t)$ at 86 are true. Consequently, the $C_1(t)$ pulse at 84 appears in the output of gate 92 at 87.

Similarly, once the output of gate 104 goes false at 83, null detector 10 becomes responsive to the phase of $e_0(t)$. When this condition exists, each $C_1(t)$ pulse which occurs when $X_r(t)$ is true appears at either the output of inverter 107 or the output of gate 104, depending upon whether or not the signals $X_p(t)$ and $X_{pd}(t)$ are simultaneously true. A pulse at the output of inverter 107 indicates that the quantity $\theta_0(t)$ was found to be in the index quantum when last sampled, while a pulse at the output of gate 104 indicates that it was not. In a typical case, during the $C_1(t)$ pulse at 84, both $X_r(t)$ at 85 and $X_p(t)$ at 86 are true, but $X_{pd}(t)$ at 88 is not. Consequently, this pulse appears in the output of gate 104 at 89 but not in the output of inverter 107 at 98. Such response indicates that at the time of the last positive-slope zero crossing of $e_0(t)$ at 99, $\theta_0(t)$ was not in the index quantum. Similarly, since $\theta_0(t)$ is still outside of the index quantum when $e_0(t)=0$ at 108, a corresponding $C_1(t)$ pulse appears in the output of gate 104 at 109, but not in the output of inverter 107 at 135.

The encoder shaft enters the index quantum at 136. However, its presence there is not detected until the first positive-slope zero crossing of $e_0(t)$ at 137 during which the shaft angle $\theta_0(t)$ is in the index quantum. Then, during the $C_1(t)$ pulse at 138, $X_r(t)$ at 139, $X_p(t)$ at 140, and $X_{pd}(t)$ at 141 are simultaneously true. Consequently, the $C_1(t)$ pulse at 138 appears in the output of inverter 107 at 142, but not in the output of gate 104 at 143, to indicate that the index quantum has been reached.

As soon as the output of inverter 107 goes true at 142, flip-flop 105 goes true in response to this variation at its override set input terminal, causing the signal $\overline{X}_n(t)$ to go false at 144. This signal, in turn, inhibits the output $X_d(t)$ at 145 to indicate that the encoder shaft was found to be in the index quantum at the time of the last positive-slope zero crossing of the carrier $e_0(t)$. Consequently, variation of shaft angle $\theta_0(t)$ ceases at 146 and the indexing procedure is complete.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:
1. Means for establishing the index position from which an incremental position encoder coupled to a movable member may measure absolute position, comprising the combination of:
   means responsive to said movable member for generating an output indicative of the limits of the index position;
   means responsive to the output of the generating means for converting the output of the generating means into an output indicative of the direction the movable member should be moved to align with the index position; and
   means responsive to the output of the converting means for determining when the position of said movable member lies within said index position.

2. The index position establishing means of claim 1 wherein the output of said converting means also indicates the approximate displacement of the instantaneous position of said movable member from said index position so as to permit the speed of said member to be reduced in the vicinity of said index position.

3. The index position establishing means of claim 2 wherein said means for determining when the position of said movable member lies within said index position has first and second operating modes selected in accordance with the absolute value of the instantaneous displacement of the position of said movable member from said index position, said first mode being associated with large absolute errors and said second mode being associated with small absolute errors, the output of said determining means being the same as the output of said converting means in said first mode, and the output of said determining means indicating when the position of said member enters said index position in said second mode.

4. The index position establishing means of claim 3 wherein said incremental position encoder is operative to convert the position of said movable member into a phase modulation of a reference carrier signal and wherein the phase of said phase modulated carrier signal is converted into a pair of incremental signal trains indicative of the amount of motion of said member, said determining means being operative, in the second mode, to ascertain whether the phase angle of said phase shifted carrier lies in an upper or lower quadrant by determining the polarity of said phase shifted carrier each time the phase of said reference carrier equals zero, said index position being identified as the point at which said phase shifted carrier changes quadrants.

5. The index position establishing means of claim 1 wherein said movable member is a rotary shaft and wherein the output of said means for generating provides signals for discrimination between said index position and a position 180° from said index position.

6. The index establishing means of claim 1, wherein the generating means comprises:
   an opaque disc rigidly mounted on said movable member perpendicular to the rotational axis and concentric therewith, said disc having sectors of two transparent rings extending in opposite directions from a common radius;
   a pair of photocells mounted near said disc opposite said rings with their sensitive elements oriented toward said disc, said photocells being located so that a line passing through the center of each intersects said rotational axis so that the centers of said photocells define said index position, said photocells being responsive to a beam of collimated light communicated through said transparent rings;
   means for deriving the difference between the outputs of said photocells so as to provide an output indicative of the limits of said index position; and
   means for deriving the sum of the output of said photocells so as to permit discrimination between said index position and a position 180° from said index position.

7. The index position establishing means of claim 6 wherein the output of said converting means also indicates the approximate displacement of the instantaneous position of said movable member from said index position so as to permit the speed of said member to be reduced in the vicinity of said index position.

8. The index position establishing means of claim 7 wherein said means for determining when the position of said movable member lies within said index position has first and second operating modes selected in accordance with the absolute value of the instantaneous displacement of the position of said movable member from said index position, said first mode being associated with large absolute errors and said second mode being associated with small absolute errors, the output of said determining means being the same as the output of said converting means in said first mode, and the output of said determining means indicating when the position of said member enters said index position in said second mode.

9. The index position establishing means of claim 8 wherein said incremental position encoder is operative to convert the position of said movable member into a phase modulation of a reference carrier signal and wherein the phase of said phase modulated carrier signal is converted into a pair of incremental signal trains indicative of the amount of motion of said member, said determining means being operative, in the second mode, to ascertain whether the phase angle of said phase shifted carrier lines in an upper or lower quadrant by determining the polarity of said phase shifted carrier each time the phase of said reference carrier equals zero, said index position being identified as the point at which said phase shifted carrier changes quadrants.

10. The invention as stated in claim 1:
said movable member being a rotary shaft and the output of the generating means being signals for indicating the shortest path to the index position and for eliminating ambiguity in indicating the proper direction of rotation of the rotary shaft.

11. The invention as stated in claim 1, in combination with an incremental position encoder comprising:
means for providing a transducer phase shift channel responsive to said movable member; and
means for producing phase shift demodulation responsive to signal output of the transducer phase shift channel.

12. The invention as stated in claim 11, including:
means for providing reference signals for the transducer phase shift means and for the position determining means.

13. The invention as stated in claim 1, wherein the position determining means comprises:
a quadrant detector and a null detector having digital logic means.

14. The invention as stated in claim 1:
the converting means being a coarse index detector responsive to analog signal inputs and providing digital logic outputs.

References Cited

UNITED STATES PATENTS

| | | | |
|---|---|---|---|
| 2,796,598 | 6/1957 | Cartwright | 340—271 X |
| 3,046,541 | 7/1962 | Knox. | |
| 3,310,798 | 3/1967 | Wingate. | |
| 3,323,120 | 5/1967 | Uehlin et al. | |
| 3,326,077 | 6/1967 | Vandermeer. | |
| 3,392,283 | 7/1968 | Tomek | 340—271 X |
| 3,420,347 | 1/1969 | Bales | 192—142 |

RALPH G. NILSON, Primary Examiner

C. M. LEEDOM, Assistant Examiner

U.S. Cl. X.R.

192—142; 250—219, 231; 318—20.315; 340—271, 347